(12) United States Patent
Huang

(10) Patent No.: US 8,469,531 B2
(45) Date of Patent: Jun. 25, 2013

(54) ALL-DIRECTIONAL MACHING TOOL LAMP

(75) Inventor: Tony Huang, Taichung (TW)

(73) Assignee: Hiever Co., Ltd., Taichung (TW)

( * ) Notice: Subject to any disclaimer, the term of this patent is extended or adjusted under 35 U.S.C. 154(b) by 48 days.

(21) Appl. No.: 13/335,141

(22) Filed: Dec. 22, 2011

(65) Prior Publication Data

US 2012/0170246 A1    Jul. 5, 2012

(30) Foreign Application Priority Data

Jan. 3, 2011 (TW) .............................. 10200052 U

(51) Int. Cl.
*F21V 33/00* (2006.01)

(52) U.S. Cl.
USPC ........................................................ 362/89

(58) Field of Classification Search
None
See application file for complete search history.

(56) References Cited

U.S. PATENT DOCUMENTS

| | | | |
|---|---|---|---|
| 7,828,454 B2 * | 11/2010 | Seitz et al. | 362/89 |
| 8,197,080 B2 * | 6/2012 | Fujihara et al. | 362/90 |
| 2005/0286243 A1 * | 12/2005 | Ranish et al. | 362/89 |
| 2008/0025015 A1 * | 1/2008 | Seitz et al. | 362/89 |
| 2010/0085730 A1 * | 4/2010 | Chen et al. | 362/89 |

* cited by examiner

*Primary Examiner* — Natalie Walford
(74) *Attorney, Agent, or Firm* — Muncy, Geissler, Olds & Lowe, PLLC

(57) ABSTRACT

An all-directional machine tool lamp includes an annular lamp, which includes a locating ring, which defines an upper part having a relatively smaller inner diameter, a lower part having a relatively greater inner diameter and a flange disposed at an inner side between the upper part and the lower part, three screw bolts equiangularly inserted through the locating ring to lock it to a vertically movable spindle of a machine tool, a lamp holder affixed to the lower part of the locating ring, light-emitting devices mounted in the lamp holder and a lampshade affixed to the bottom side of the lamp holder, and a switch device, which includes a housing, a switch mounted in the housing and electrically connected with the light-emitting devices by an electrical cord and a fastening member adapted for fastening the housing to the machine tool.

10 Claims, 8 Drawing Sheets

ALL-DIRECTIONAL MACHING TOOL LAMP

BACKGROUND OF THE INVENTION

1. Field of the Invention

The present invention relates to lighting designs for drill press or mill, and more particularly, to an all-directional machine tool lamp practical for use in a machine tool.

2. Description of the Related Art

As shown in FIG. 1, a lighting device in a drill press 10 (the imaginary line indicates the position of the light source) emits light downwardly from the back side behind the spindle 11 to illuminate the workpiece 12 right below the spindle 11, causing a shadow to form in front of the spindle 11. The location of the shadow is the best position for the user to operate the drill press 10. Further, when the cutter 13 touches the workpiece 12, the shadow may shade the hole-drilling part of the workpiece 12, causing the user unable to see the workpiece 12 clearly.

FIG. 2 illustrates another illumination design in a drill press 10 according to the prior art. According to this design, a snake lamp 14 is arranged at one lateral side of the machine frame. The light of the snake lamp 14 can be focused on the workpiece 12, avoiding a shadow in front of the spindle 11 to hinder the line of sight. However, a shadow will occur at the other lateral side opposite to the snake lamp 14. When the cutter 13 touches the workpiece 12, the shadow will also shade the hole-drilling part of the workpiece 12, causing the user unable to see the workpiece 12 clearly.

Further, when operating the drill press 10 to cut the workpiece 12, waste chips will be ejected in all directions. Either the user stands in front of the drill press 10 or on one lateral side relative to the drill press 10, the user may be injured by waste chips.

SUMMARY OF THE INVENTION

The present invention has been accomplished under the circumstances in view. It is the main object of the present invention to provide an all-directional machine tool lamp, which enables the user to seen the workpiece during working and effectively protects the user against waste chips.

To achieve this and other objects of the present invention, an all-directional machine tool lamp is mountable at a vertically movable spindle of a machine tool, comprising an annular lamp and a switch device. The annular lamp comprises a locating ring, a plurality of screw bolts, a lamp holder and a plurality of light-emitting devices. The screw bolts are equiangularly inserted through the locating ring for locking the locating ring to the vertically movable spindle of the machine tool. The locating ring comprises an upper part having a relatively smaller inner diameter, a lower part having a relatively greater inner diameter and a flange disposed at an inner side between the upper part and the lower part. The lamp holder is fixedly mounted in the lower part of the locating ring. The light-emitting devices are mounted in the lamp holder. The lampshade is affixed to the bottom side of the lamp holder. Further, the switch device is electrically connected with the light-emitting devices by an electrical cord, comprising a housing, a switch mounted in the housing, and a fastening member adapted for fastening the housing to the machine tool.

Thus, the all-directional machine tool lamp can be moved with the spindle of the machine tool toward or apart from the workpiece to illuminate the surrounding area around the spindle of the machine tool without any shadow. Thus, the user can see the workpiece clearly when operating the machine tool Other advantages and features of the present invention will be fully understood by reference to the following specification in conjunction with the accompanying drawings, in which like reference signs denote like components of structure.

DETAILED DESCRIPTION OF THE INVENTION

Figure 1:
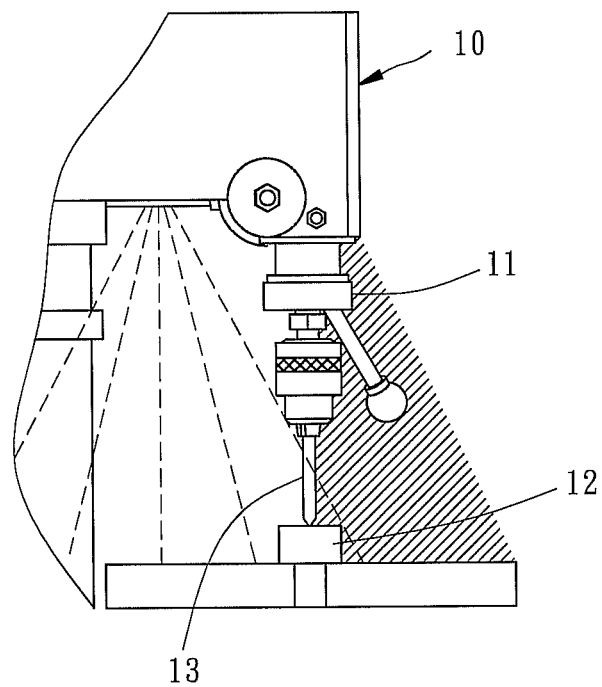
FIG. 1 is a schematic side view illustrating a lighting design of a drill press according to the prior art.
Figure 2:
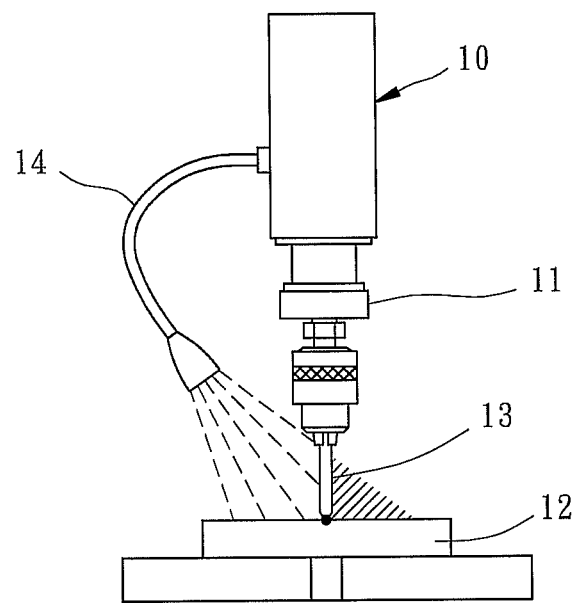
FIG. 2 is a schematic front view illustrating another lighting design in a drill press according to the prior art.
Figure 3:
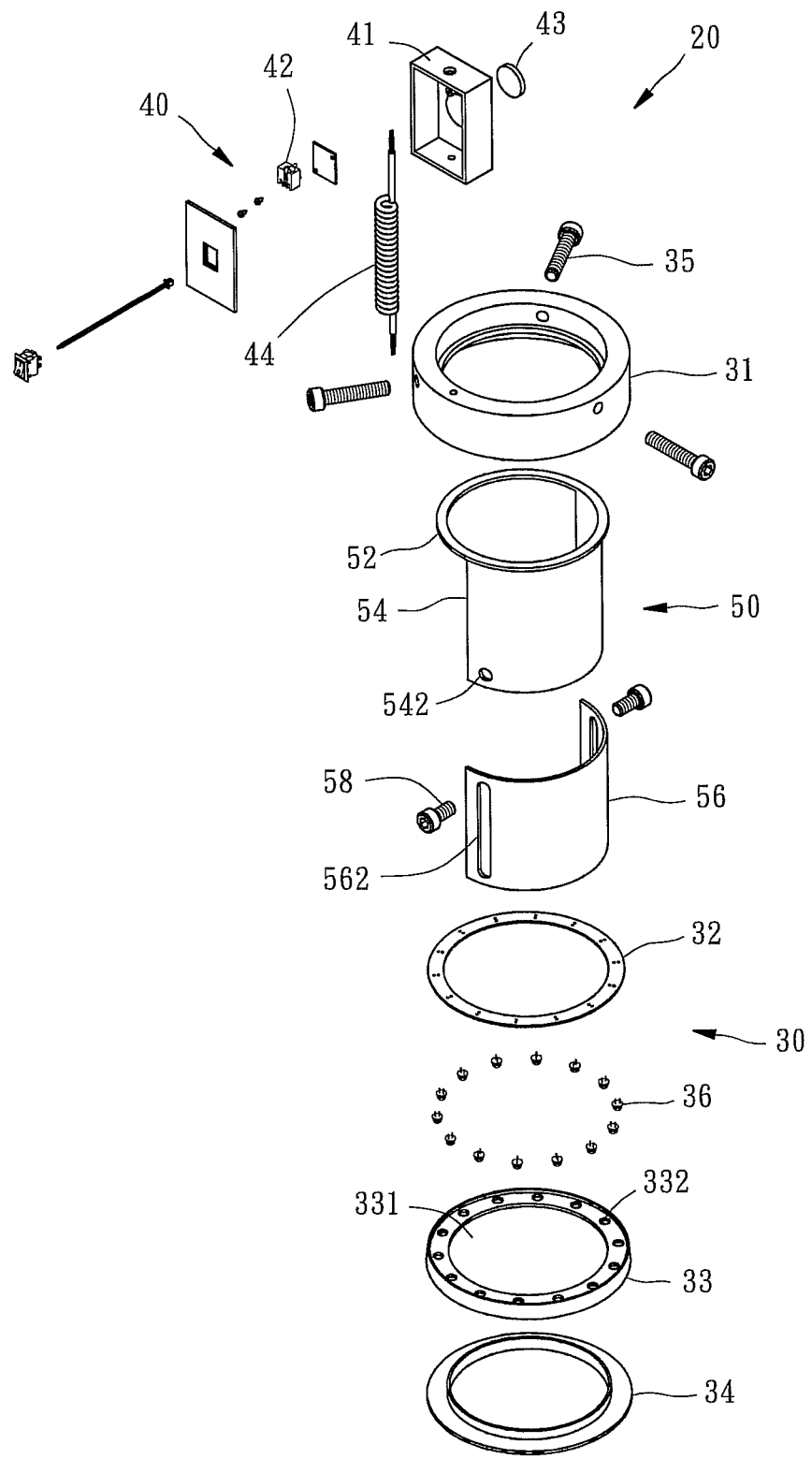
FIG. 3 is an exploded view of an all-directional machine tool lamp in accordance with a first embodiment of the present invention.
Figure 4:
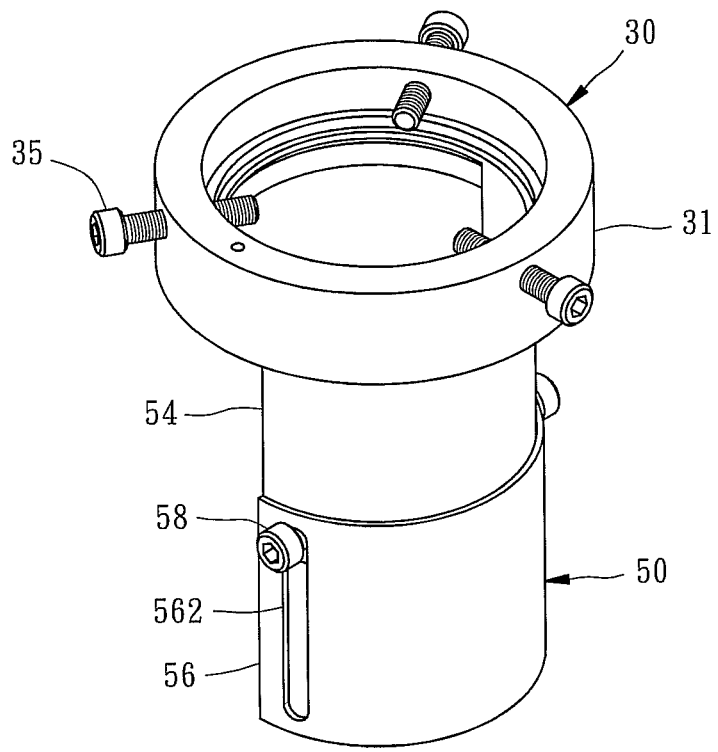
FIG. 4 is an elevational assembly view of the annular lamp and shield of the all-directional machine tool lamp in accordance with the first embodiment of the present invention.
Figure 5:
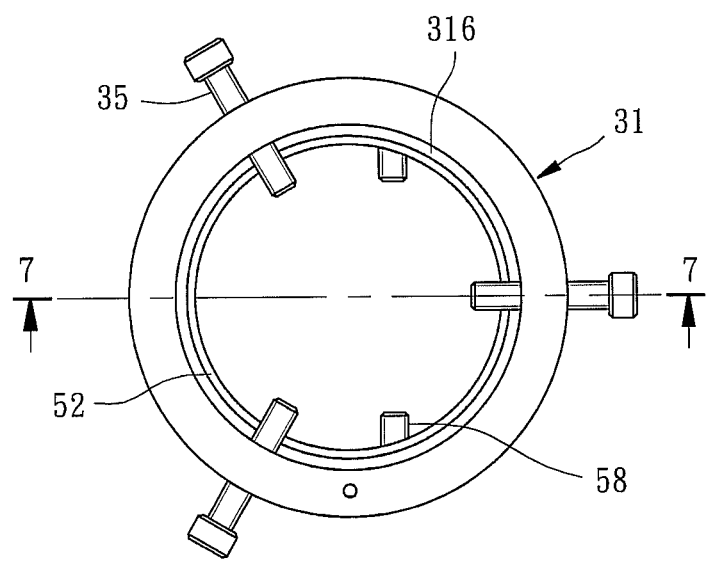
FIG. 5 is a top view of FIG. 4.

Referring to FIGS. 3-5, an all-directional machine tool lamp 20 in accordance with a first embodiment of the present invention is shown. The all-directional machine tool lamp 20 comprises an annular lamp 30, a switch device 40, and a shield 50.

Figure 6:
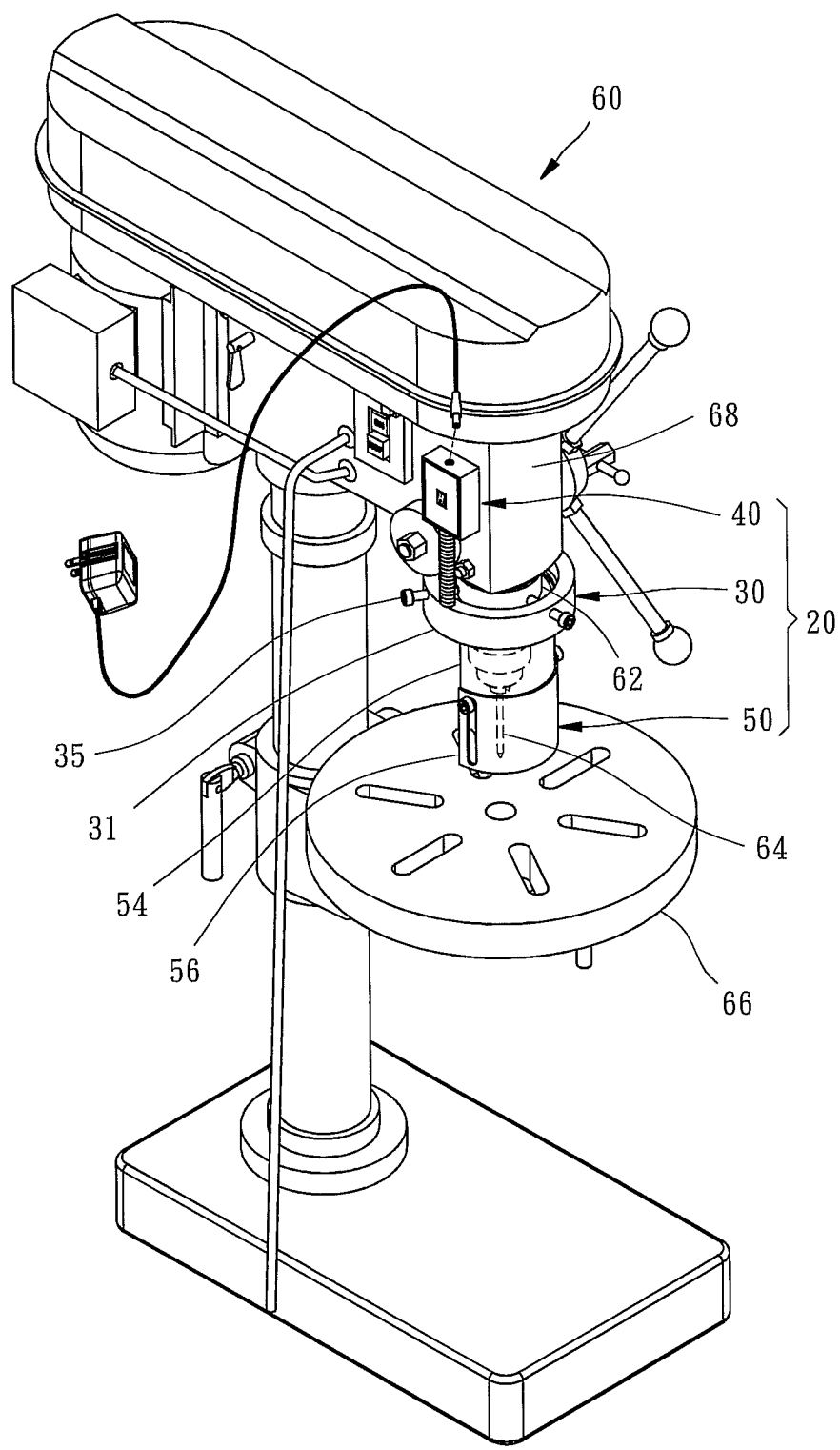
FIG. 6 is an applied view of the first embodiment of the present invention, illustrating the all-directional machine tool lamp installed in a drill press.

Referring also to FIG. 6, the all-directional machine tool lamp 20 is installed in a vertically movable spindle 62 of the machine tool 60. In this example, the machine tool 60 is a drill press; the vertically movable spindle 62 is adapted to move a drill bit 64 downwardly in drilling a hole on a workpiece (not shown) at a table 66.

As shown in FIG. 3, the annular lamp 30 comprises a locating ring 31, a connection circuit 32, a lamp holder 33, a lampshade 34, three screw bolts 35 and a plurality of light-emitting devices 36.

Figure 7:
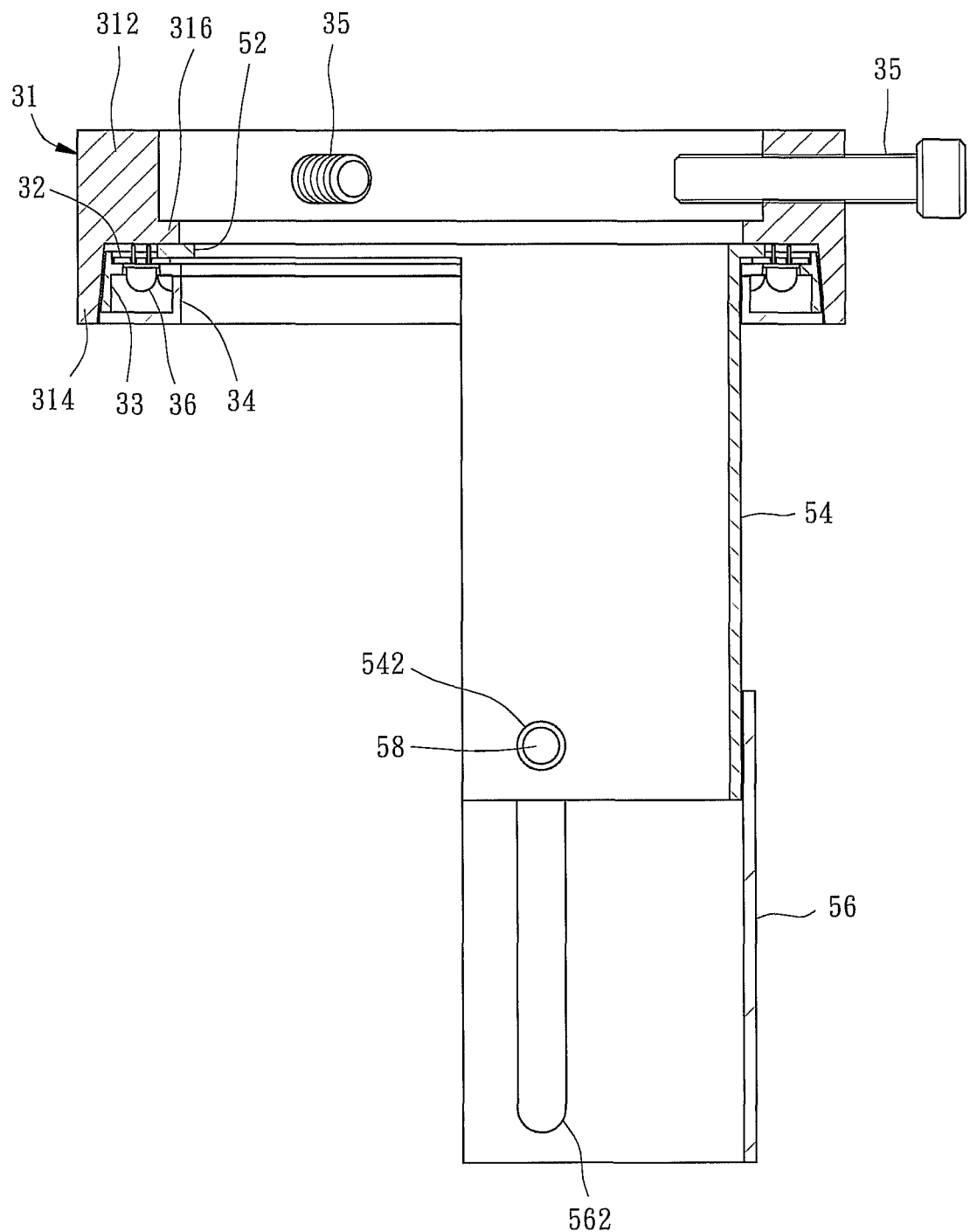
FIG. 7 is a sectional view taken along line 7-7 of FIG. 5.

Referring also to FIG. 7, the locating ring 31 defines an upper part 312 having a relatively smaller inner diameter, a lower part 314 having a relatively greater inner diameter, and a flange 316 disposed at an inner side between the upper part 312 and the lower part 314. The screw bolts 35 are radially inwardly inserted through the upper part 312 of the locating ring 31, and equally spaced from one another. As shown in FIG. 6, the locating ring 31 is sleeved onto the spindle 62 of the machine tool 60. The screw bolts 35 and tightly stopped against the spindle 62 to lock the locating ring 31 to the spindle 62. Thus, by means of the screw bolts 35, the locating ring 31 can be locked to one of a series of spindles 31 having different diameters.

The lamp holder 33 defines a center opening 331, and a plurality of through holes 332 equiangularly spaced around the center opening 331 (see FIG. 3). The light-emitting devices 36 are respectively mounted in the through holes 332 of the lamp holder 33. The connection circuit 32 is covered on the through holes 332 of the lamp holder 33 and electrically connected with the conducting pins of the light-emitting devices 36. The lamp holder 33 is fixedly mounted in the lower part 314 of the locating ring 31. The lampshade 34 is affixed to the bottom side of the lamp holder 33. Thus, the annular lamp 30 is movable with the spindle 62 toward or apart from the workpiece, holding the light-emitting devices 36 in an equally spaced manner around the spindle 62.

Figure 8:
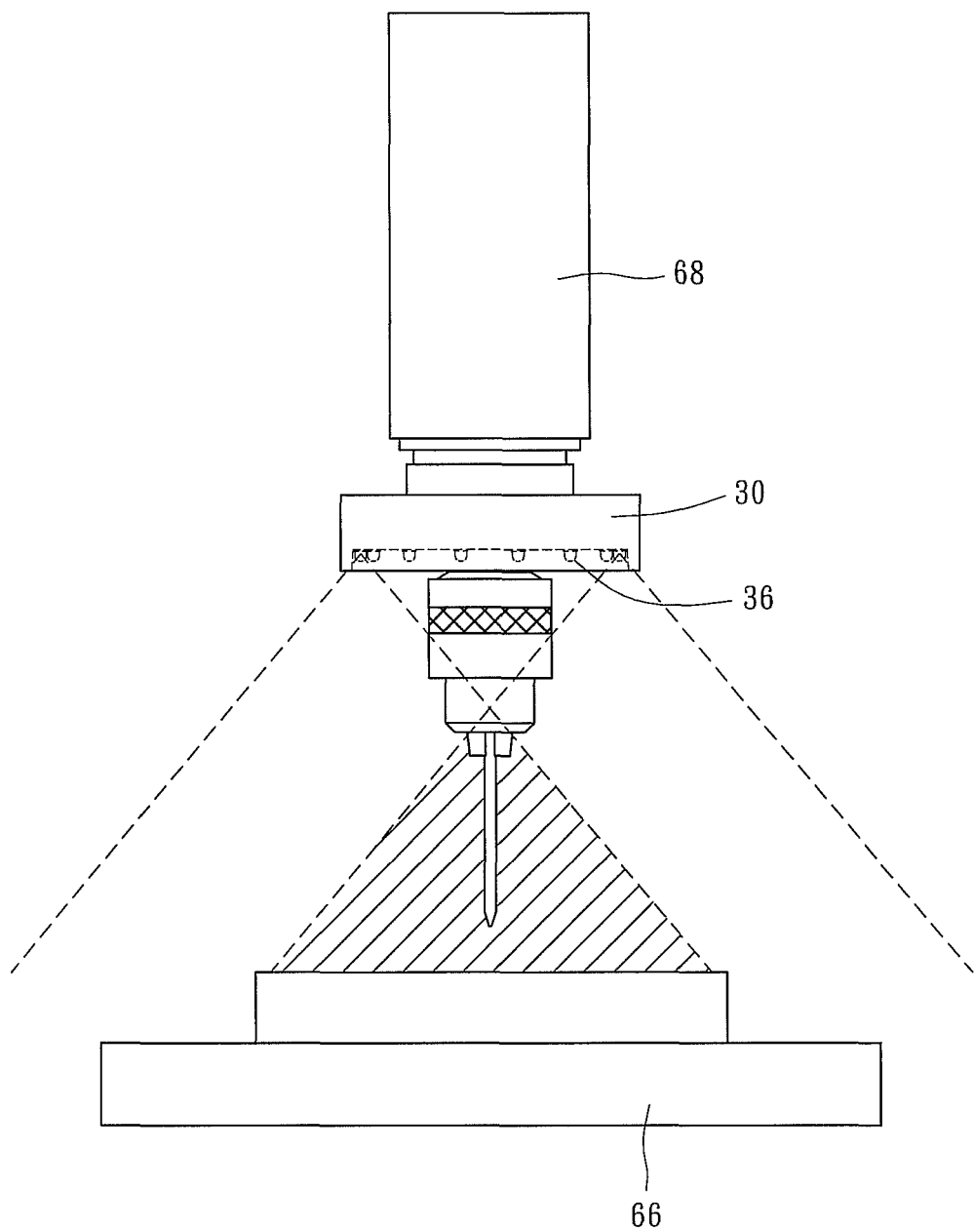
FIG. 8 is a schematic drawing of the present invention, illustrating an operation status of the all-directional machine tool lamp in the drill press.

The switch device 40 is electrically connected with the light-emitting devices 36, and adapted for electrically connecting the light-emitting devices 36 to a power source (not shown). The switch device 40 comprises a housing 41, a switch 42, and a fastening member 43. The fastening member 43 can be an adhesive or magnet. Further, an electrical cord 44 is electrically connected between the switch device 40 and the annular lamp 30. By means of the fastening member 43, the switch device 40 is fastened to the body 68 of the machine tool 60. The mounting position of the switch device 40 at the body 68 of the machine tool 60 is determined subject to user habit or user need. When the user operates the switch device 40 to switch on the light-emitting devices 36, the surrounding area around the spindle 62 is well illuminated without any shadow. Thus, the user can see the workpiece clearly when operating the machine tool 60, as shown in FIG. 8. In this embodiment, the light-emitting devices 36 are light-emitting diodes (LEDs). However, this is not a limitation.

The shield 50 comprises a mounting ring 52, a first shield plate 54, and a second shield plate 56. The first shield plate 54 and the second shield plate 56 are semicircular plate members. The first shield plate 54 extends downwardly from the mounting ring 52. The second shield plate 56 is coupled to the first shield plate 54 at the bottom side, and movable up and down relative to the first shield plate 54 and lockable thereto. In this embodiment, the first shield plate 54 comprises two mounting through holes 542 bilaterally disposed near the bottom side thereof; the second shield plate 56 comprises two elongated sliding slots 562 respectively disposed along two opposite lateral sides thereof. Further, two screws 58 are respectively inserted through the elongated sliding slots 562 of the second shield plate 56 and threaded into the mounting through holes 542 of the first shield plate 54 to adjustably lock the second shield plate 56 to the first shield plate 54 to the desired elevation. Subject to the locking position of the screws 58 relative to the elongated sliding slots 562, the length of the part of the second shield plate 56 that protrude over the bottom side of the first shield plate 54 is determined.

The mounting ring 52 of the shield 50 is rotatably secured between the flange 316 of the locating ring 31 of the annular lamp 30 and the connection circuit 32.

After installation, the first shield plate 54 extends downwardly out of the annular lamp 30. However, broadly speaking, the mounting ring 52 of the shield 50 is rotatably secured between the locating ring 31 of the annular lamp 30 and the lamp holder 33. Further, more broadly speaking, the shield 50 is rotatably coupled to the annular lamp 30 by the mounting ring 52. Thus, the user can push the first shield plate 54 or second shield plate 56 to rotate the shield 50, moving the first shield plate 54 and the second shield plate 56 to any desired position around the spindle 62 of the machine tool 60. Thus, when operating the machine tool 60, the first shield plate 54 and the second shield plate 56 can be moved to a position between the user and the spindle 62 where the shield 50 effectively protects the user against any waste chips. When the machine tool 60 is off, the user can move the first shield plate 54 and the second shield plate 56 to a back side behind the spindle 62 of the machine tool 60, avoiding hindering a drill bit replacement or detachment work. The first shield plate 54 and the second shield plate 56 are preferably made of a transparent material so that they can protect the user without blocking the line of sight.

Figure 9:
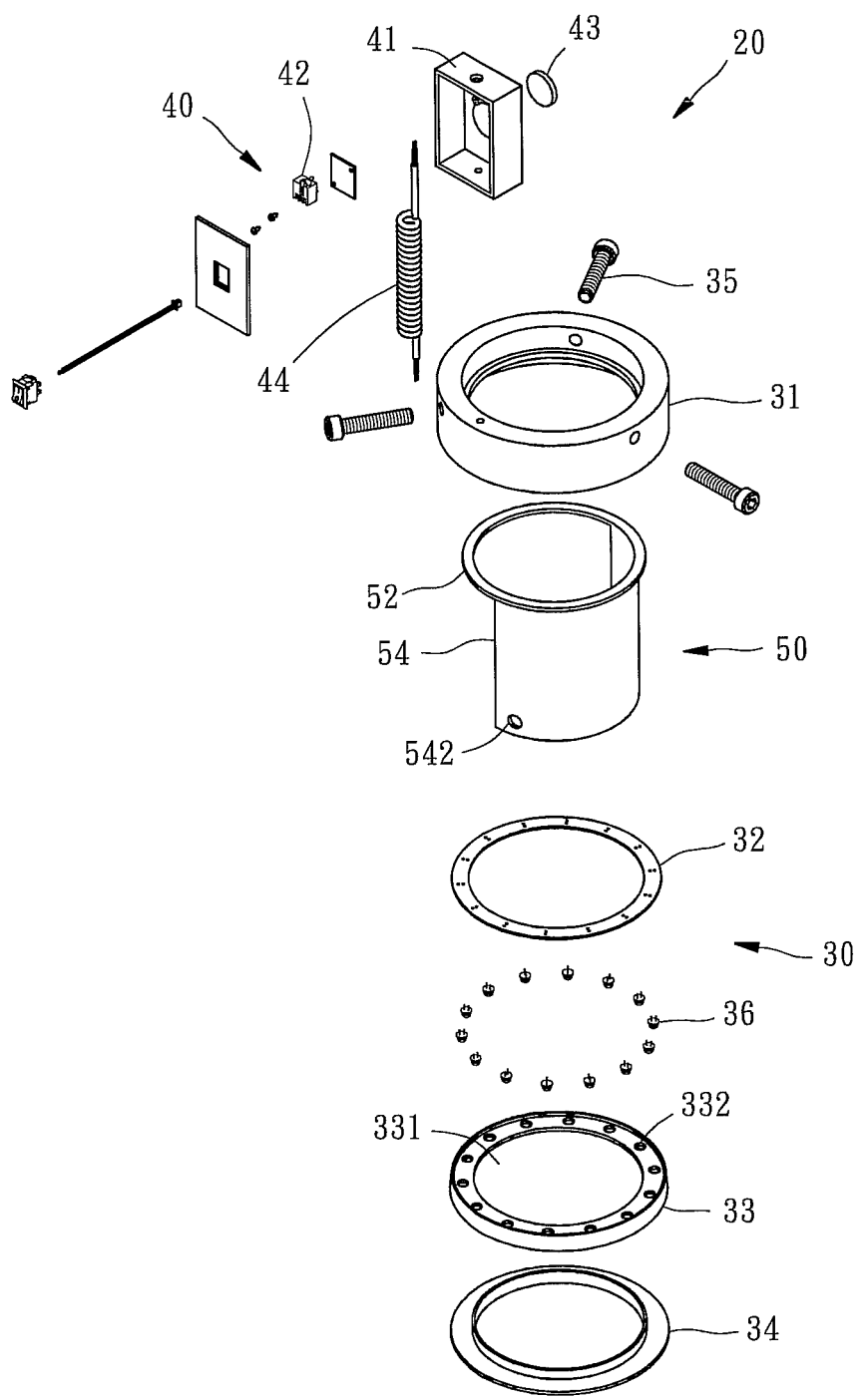
FIG. 9 is an exploded view of an all-directional machine tool lamp in accordance with a second embodiment of the present invention.

In actual practice, the user can selectively use the shield 50 subject to actual requirements. FIG. 9 illustrates an all-directional machine tool lamp in accordance with a second embodiment of the present invention. Similar to the aforesaid first embodiment, this second embodiment also includes an annular lamp 30, a switch device 40, and a shield 50. However, this second embodiment eliminates the aforesaid second shield plate 56 from the shield 50. This embodiment is practical for use in a machine tool that has a relatively shorter working stroke.

Figure 10:
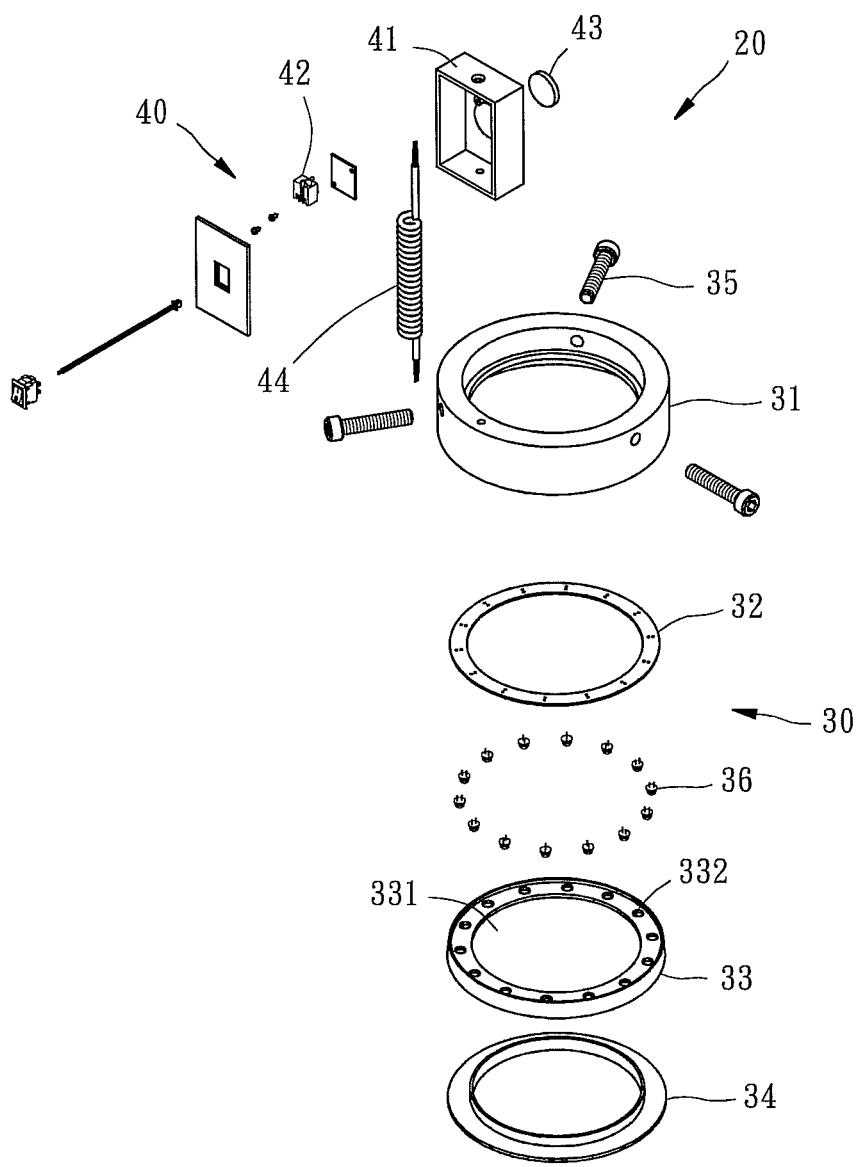
FIG. 10 is an exploded view of an all-directional machine tool lamp in accordance with a third embodiment of the present invention.

FIG. 10 illustrates an all-directional machine tool lamp in accordance with a third embodiment of the present invention. Similar to the aforesaid first embodiment, this second embodiment also includes an annular lamp 30 and a switch device 40. However, this third embodiment eliminates the aforesaid shield 50. However, this embodiment is practical for use in a machine tool that does not require a shielding protection. As the shield 50 is easily detachable, the user can decide to use or not to use the shield 50 subject to different working conditions.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An all-directional machine tool lamp for mounting at a vertically movable spindle of a machine tool, comprising:
   an annular lamp, said annular lamp comprising a locating ring, a plurality of screw bolts equiangularly inserted through said locating ring for locking said locating ring to said vertically movable spindle of said machine tool, said locating ring comprising an upper part having a relatively smaller inner diameter, a lower part having a relatively greater inner diameter and a flange disposed at an inner side between said upper part and said lower part, a lamp holder fixedly mounted in the lower part of said locating ring, a plurality of light-emitting devices mounted in said lamp holder, and a lampshade affixed to a bottom side of said lamp holder; and
   a switch device electrically connected with said light-emitting devices by an electrical cord, said switch device comprising a housing, a switch mounted in said housing, and a fastening member adapted for fastening said housing to said machine tool.

2. The all-directional machine tool lamp as claimed in claim 1, further comprises a shield connected to said annular lamp, said shield comprising a first shield plate downwardly protruding over a bottom side of said annular lamp, and a second shield plate coupled to said first shield plate at a bottom side, said first shield plate and said second shield plate being movable around said spindle of said machine tool, said second shield plate being movable relative to said first shield plate and lockable to said first shield plate.

3. The all-directional machine tool lamp as claimed in claim 2, wherein said first shield plate of said shield comprises at least one mounting through hole; said second shield plate comprises at least one elongated sliding slot; said shield further comprises at least one screw respectively inserted through the at least one elongated sliding slot of said second shield plate and threaded into the at least one mounting through hole to adjustably lock said second shield plate to said first shield plate.

4. The all-directional machine tool lamp as claimed in claim 2, wherein said shield further comprises a mounting ring fixedly connected with said first shield plate and rotatably coupled to said annular lamp.

5. The all-directional machine tool lamp as claimed in claim 4, wherein said mounting ring of said shield is rotatably secured between said locating ring and said lamp holder of said annular lamp.

6. The all-directional machine tool lamp as claimed in claim 5, wherein said annular lamp further comprises a connection circuit electrically connected with said light-emitting devices; said mounting ring of said shield is rotatably secured between said flange of said locating ring and said connection circuit of said annular lamp.

7. The all-directional machine tool lamp as claimed in claim 1, wherein each said light-emitting device is a light-emitting diode.

8. The all-directional machine tool lamp as claimed in claim 1, wherein said second shield plate is a transparent plate.

9. The all-directional machine tool lamp as claimed in claim 1, wherein said first shield plate is a transparent plate.

10. The all-directional machine tool lamp as claimed in claim 1, wherein said fastening member is a magnet.

\* \* \* \* \*